(12) United States Patent
Dent

(10) Patent No.: US 6,438,557 B1
(45) Date of Patent: Aug. 20, 2002

(54) SYSTEM AND METHOD FOR PERFORMING CONTEXT SWITCHING AND RESCHEDULING OF A PROCESSOR

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/338,732

(22) Filed: Jun. 23, 1999

(51) Int. Cl.[7] .............................................. G06F 17/00
(52) U.S. Cl. .......................... 707/102; 713/502; 712/32
(58) Field of Search ...................... 712/35–37, 209–211, 712/32–34; 713/502, 500–501; 707/102; 370/394–399, 458

(56) References Cited

U.S. PATENT DOCUMENTS 6,356,995 B2 * 3/2002 Chen .......................... 712/209
6,359,891 B1 * 3/2002 Bergantino et al. ......... 370/398
6,374,286 B1 * 4/2002 Gee et al. .................... 713/502

OTHER PUBLICATIONS

Hiser et al., "Global register partioning", Parallel Architectures and Compilation Techniques, 2000, Proceedings, International Conference on, 2000, pp. 13–23.*
Gass, "Higher performance and lower power enhancements to VLIW architectures", Signal Processing Systems, 2001 IEEE Workshop on, 2001, p. 157.*
Lewis et al., "Exploiting typical DSP data access patterns and asynchrony for a low power multiported register bank", Asynchronous Circuits and Systems, 2001, ASYNC 2001, Seventh International Symposium on, 2001, pp. 4–14.*

* cited by examiner

Primary Examiner—David Jung
(74) Attorney, Agent, or Firm—Coats & Bennett, P.L.L.C.

(57) ABSTRACT

A system for switching resources of a computer among a plurality of programs is provided, including a processor for executing programs for the computer. The system further includes a set of register banks coupled to the processor for storing information for the plurality of programs, where each register bank includes a plurality of program information registers in correspondence with the plurality of programs, the set of register banks having a selection input for selecting a current program for the processor to execute. A status register is coupled to the processor for storing in a prioritized order a status bit corresponding to each program, where each status bit has a status bit address and indicates a status of the corresponding program as being one of active and inactive. Each location of the status register is connected to a program determination logic circuit for determining the status bit address of a highest priority active program. The program determination logic circuit is coupled to the set of register banks for providing the status bit address of the highest priority active program to the selection input, where the highest priority active program is selected as the current program.

17 Claims, 4 Drawing Sheets

SYSTEM AND METHOD FOR PERFORMING CONTEXT SWITCHING AND RESCHEDULING OF A PROCESSOR

FIELD OF THE INVENTION

The present invention is directed toward a processor for a computer, and more particularly, toward context switching and rescheduling of a processor.

BACKGROUND OF THE INVENTION

A processor for a computer may execute a variety of contexts (programs) stored in a memory of the computer, where each program is made up of multiple instructions, and each of the instructions is stored at a specific location in the memory. The programs allow the processor to carry out various tasks, for example in a cellular telephone, outputting data to a display device, maintaining a radio link with a cellular base station or providing a calculator feature to the user of the cellular telephone. The processor executes a program by sequentially retrieving the instructions corresponding to the program from memory, and processing the instructions one at a time.

While processing instructions, the processor utilizes specific registers (i.e., accumulator registers, index registers) present in the processor by placing values in the specific registers and performing logical and arithmetic operations on the values, or otherwise manipulating the values. A program counter register indicates the memory location for the current instruction being processed by the processor and increments by the length in bytes of the just executed instruction so as to point to the next instruction to be processed.

Although various programs may reside in memory, not all programs have a need for processor resources at a given time, as they may have completed a task and are waiting for new input to process. Such a program is said to be in the "inactive state." Other programs which have work to do are said to be in the "active state." Some active programs are said to be "suspended in the active state" where they have work to do but are suspended at a given instant due to the need to wait, for example, for completion of a slow I/O operation which they have invoked. The priority of an active, non-suspended program determines whether it is the program actually being executed at a given instant.

Commonly, each program is assigned a location in computer memory where a status bit in that memory location indicates whether the program is in the active state (presence of a "1") or the inactive state (presence of an "0"). When a processor completes a program, or places a higher priority program into the active state, execution of a current program is stopped, and the program having the then highest priority active status is executed. To accomplish this, the processor must execute instructions to perform a "reschedule." Such a reschedule operation comprises software scanning, that is, successively testing the activity flags stored in the computer memory for each program in turn, in order of descending priority. The first "1" encountered indicates the active program with the highest priority and becomes the current program to be executed by the processor. However, the rescheduling operation consumes a significant number of microprocessor instructions to perform each program switch, reducing the efficiency of the processor. Further, as a significant number of instructions are required to perform a reschedule, a significant amount of battery power is consumed for each program switch.

The present invention is directed toward overcoming one or more of the problems discussed above.

SUMMARY OF THE INVENTION

In one aspect of the present invention, a system for switching resources of a computer among a plurality of programs is provided, including a processor for executing programs for the computer. The system further includes a set of register banks coupled to the processor for storing information for the plurality of programs, where each register bank includes a plurality of program information registers in correspondence with the plurality of programs, the set of register banks having a selection input for selecting a current program for the processor to execute. A status register is coupled to the processor for storing in a prioritized order a status bit corresponding to each program, where each status bit has a status bit address and indicates a status of the corresponding program as being one of active and inactive. A program determination logic circuit is coupled to the status register for determining the status bit address of a highest priority active program, and the program determination logic circuit is coupled to the set of register banks for providing the status bit address of the highest priority active program to the selection input, where the highest priority active program is selected as the current program.

In a preferred form, the program determination logic circuit of the system includes a network of multiple-input OR gates and two-way selector switches for determining the status bit address of the highest priority active program, a program address register coupled to the network for collecting the status bit address of the highest priority active program, the program address register being coupled to the selection input for providing the status bit address of the highest priority active program to the selection input.

In a preferred form, the system further includes set/reset logic coupled to the processor and the status register for changing the status of one of the plurality of programs by altering the status bit corresponding to the one program.

In a further preferred form, the system further includes a priority table coupled to the processor and the status register including a plurality of priority registers corresponding to the program information registers for storing a priority for the plurality of programs. A remapping table is coupled to the program determination logic circuit, the set of register banks, and the priority table, where the remapping table is the inverse of the priority table.

In another preferred form, an alternate priority table is coupled to the processor and the status register and comprises a plurality of alternate priority registers corresponding to the program information registers for storing the priority for the plurality of programs while the processor is executing the current program. An alternate remapping table is coupled to the program determination logic circuit, the set of register banks and the alternate priority table, where the alternate remapping table is the inverse of the alternate priority table. A selector is coupled to the priority table, the alternate priority table, the remapping table, the alternate remapping table, and the processor for selecting which of the priority table and the alternate priority table, and which of the remapping table and the alternate remapping table, are used for selecting which status bit address is sent to the selection input.

In another preferred form, the computer is a component in a mobile cellular telephone for controlling operation of the cellular telephone.

In another aspect, a method is provided for switching resources of a computer among a plurality of programs, the computer including a processor for executing programs, a set of register banks for storing a plurality of program information registers in correspondence with the plurality of programs and having a selection input for selecting a current program for the processor to execute, the method including storing in a prioritized order a status bit corresponding to each of the programs in a status register, each status bit having a status bit address and indicating a status of the corresponding program as being one of active and inactive, and communicating the status bits from the status register to a program determination logic circuit. At the program determination logic circuit, the status bit address of a highest priority status bit indicating active status is determined. The status bit address is communicated to the selection input of the set of register banks to select the current program.

In a preferred form, the step of determining the highest priority status bit includes determining if one of the status bits in a higher priority one-half of the status register indicates the active status, wherein if one of the status bits indicates the active status, the higher priority one-half of the status bits in the status register is selected and a "1" or "0" is recorded in a most significant location (MSL) in a program address register. If, however, none of the status bits indicate the active status, a lower priority one-half of the status bits in the status register are selected and the other of "1" or "0" is recorded in the MSL of the program address register. It is determined if one of the status bits in a higher priority one-half of the selected set of status bits indicates the active status, where if one of the selected status bits indicates the active status, the higher priority one-half of the selected status bits are selected, and "1" or "0" is recorded in a next MSL in the program address register. If, however, none of the selected status bits indicate the active status, a lower priority one-half of the selected status bits are selected, and the other of a "1" or "0" is recorded in the next MSL in the program address register. The process repeats until the selected set of status bits contains two status bits, where the most significant bit (MSB) of the selected set of status bits is recorded as a least significant bit (LSB) in the program address register. If the status bit address "0" is designated as the highest priority, the values in the status bit address register are complemented after the LSB is recorded in the program address register to yield the status bit address of the highest priority active program.

In another preferred form, the computer is placed into a low power operation mode when none of the status bits indicate the active status.

In a further preferred form, the status of one of the plurality of programs is changed by altering the corresponding status bit. Altering the status bit includes determining the status bit address for the status bit corresponding to the one program, and placing a selected value in the determined status bit address. If a desired status for the one program is active, the selected value is a "1" or "0". If, however, the desired status for the one program is inactive, the selected value is the other of a "1" or "0".

In a further preferred form, the prioritized order of the status bits may be altered. The computer further includes a priority table comprising a plurality of priority registers corresponding to the program information registers, wherein the step of altering the prioritized order of the status bits includes receiving a changed priority for one of the plurality of programs. A priority register address is determined for the priority register, the priority register address corresponding to the one program, and the changed priority is stored at the priority register address. The computer further includes a remapping table comprising a number of remapping registers corresponding to the priority registers, wherein a remapping table address for the remapping table is determined, the remapping table address corresponding to the changed priority, and a program address for the one program is stored at the remapping table address.

In another preferred form, the computer is used in a cellular telephone, and the step of communicating the status bit address to the selection input selects the current program for the processor of the cellular telephone to execute.

DESCRIPTION OF THE PREFERRED EMBODIMENT

Figure 1:
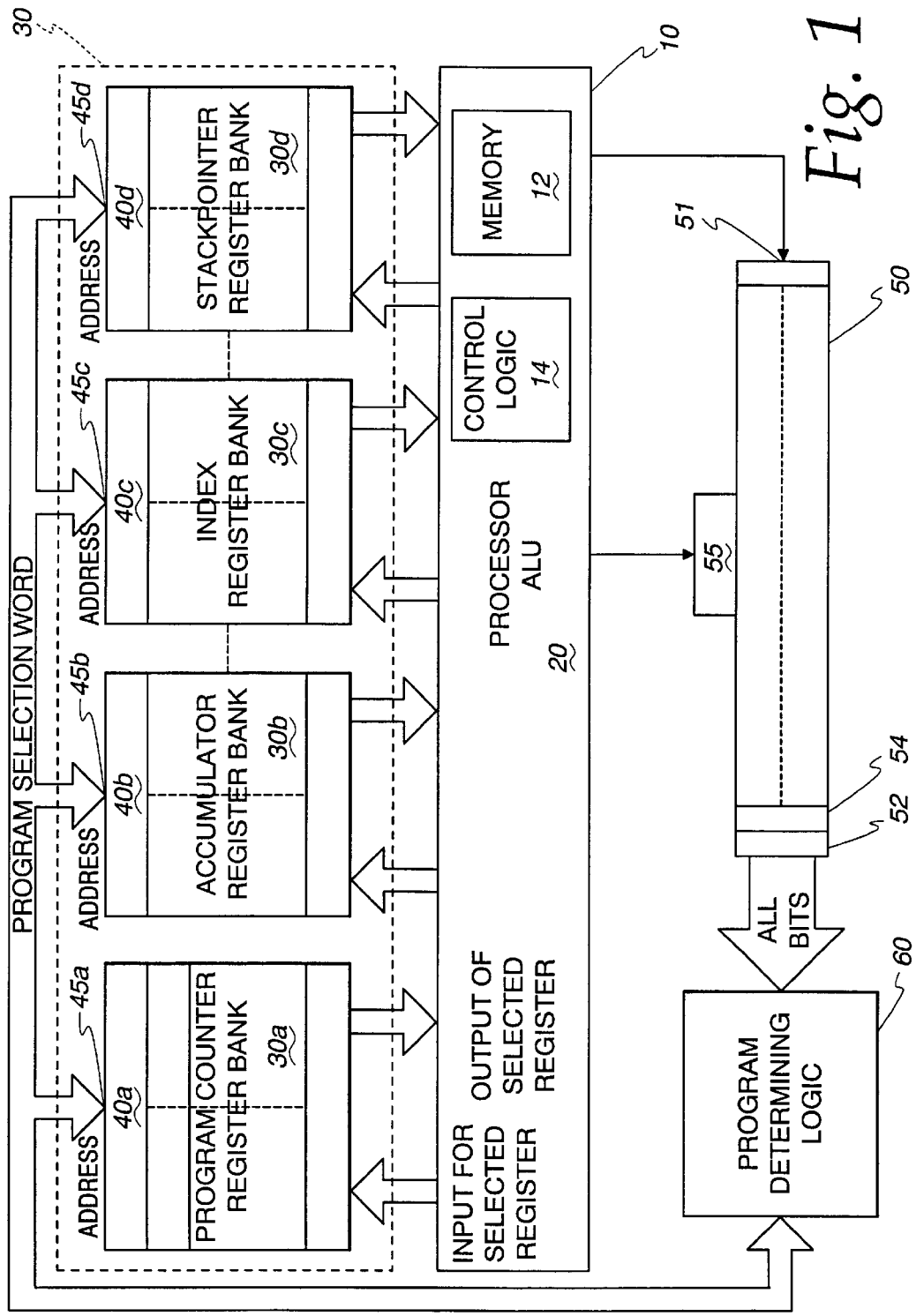
FIG. 1 is a block diagram of an embodiment of the present invention.

FIG. 1 shows a block diagram of an embodiment of the present invention. A computer 10 includes a memory 12, a control logic 14 and a suitable processor arithmetic-logic unit (ALU) 20 for executing instructions of a program. The processor 20 is connected to a set of register banks 30, which provides high speed storage and accessibility of information corresponding to a plurality of programs executable by the processor 20.

The set of register banks 30 includes a program counter register bank 30a, an accumulator register bank 30b, an index register bank 30c, and a stack pointer register bank 30d. Each of the register banks include a plurality of registers. A set of registers includes a register from each register bank, for example a program counter register 40a, an accumulator register 40b, an index register 40c, and a stack pointer register 40d, for storing information needed by the processor 20 to execute a specific program. For example, the program counter register 40a stores the location in memory of the current instruction being executed for the specific program. The accumulator register 40b, the index register 40c, and the stack pointer register 40d store the contents of an accumulator register, an index register and a stack pointer register for the processor 20 while the processor is executing the current instruction of the specific program. Each register bank 30a–30d is indexed by a program address which is entered at selection inputs 45a–45d and selects the set of registers corresponding to the specific program, thereby selecting the specific program as a current program to be executed by the computer.

The processor 20 is further coupled to a status register 50 via a status bit address input 55. The status register 50 comprises a plurality of locations, for example, locations 52 and 54, one location corresponding to each of the programs. The locations store a status bit corresponding to each program. The status bits are stored in a prioritized order, each status bit indicating a status of the corresponding program as being active ("1") or inactive ("0"). The status register is indexed by a status bit address entered through the status address input 55. An address entered at the status address input 55 enables the processor 20 to quickly access a corresponding location of the status bit register 50, executing just a small number of program instructions. A status value input 51 provides the status bit value from the processor 20 (including set/reset logic) to be stored in the status register 50.

The status register 50 is coupled to a program determining logic 60 comprising a network of multiple-input OR gates and two-way selector switches (shown in FIG. 2) for determining the status bit address for a highest priority active program as indicated by the status bits stored in the status register 50. More specifically, each location of the status register 50 is coupled to an input at the program determining logic 60, and allows the highest priority active program to be determined without needing to perform software scanning. The program determining logic 60 is further coupled to the selection inputs 45a–45d of the set of register banks 30.

Figure 2:
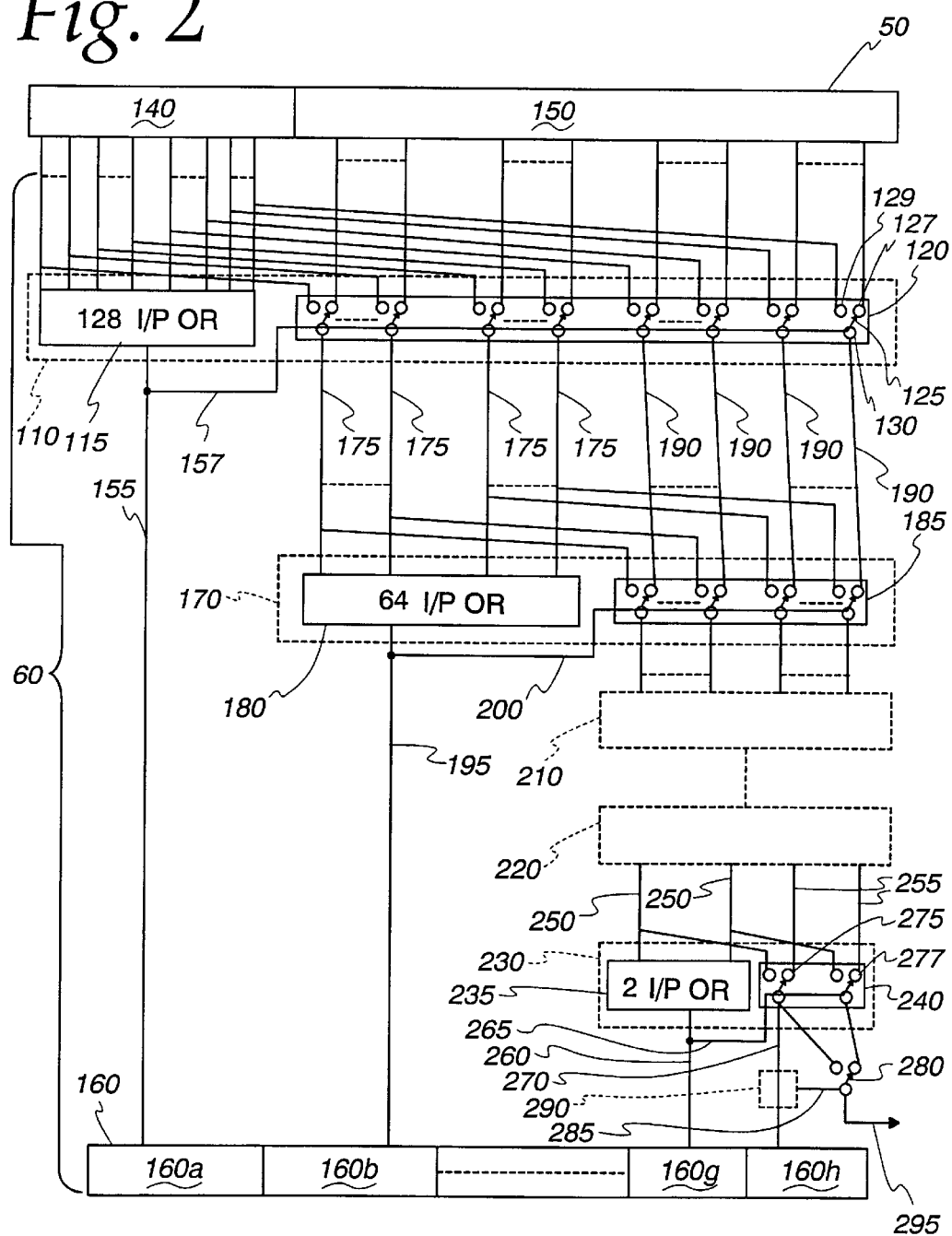
FIG. 2 is a block diagram illustrating the program determining logic of FIG. 1.

In operation, the program determining logic 60 processes the status bits in the locations of the status register 50, further discussed with respect to FIG. 2. The status bit address of the highest priority active program is determined by locating the highest priority location having a "1", where each status bit address corresponds directly to a program address. The status bit address is in the form of a binary number comprising a sufficient number of bits to provide each program a unique address. The status bit address is provided to the selection inputs 45a–45d of the set of register banks 30 as the program address, causing the corresponding set of registers to be selected by the processor 20 as the current program. When the processor 20 completes execution of the program, the processor provides the program address for the current program to the status address input 55 as the status bit address, and provides a "0" to the status value input 51, thereby changing the status of the current program to inactive. The program determining logic 60 again determines the status bit address of the highest priority active program, and the process repeats until all of the active programs are executed by the processor 20.

Figure 4:
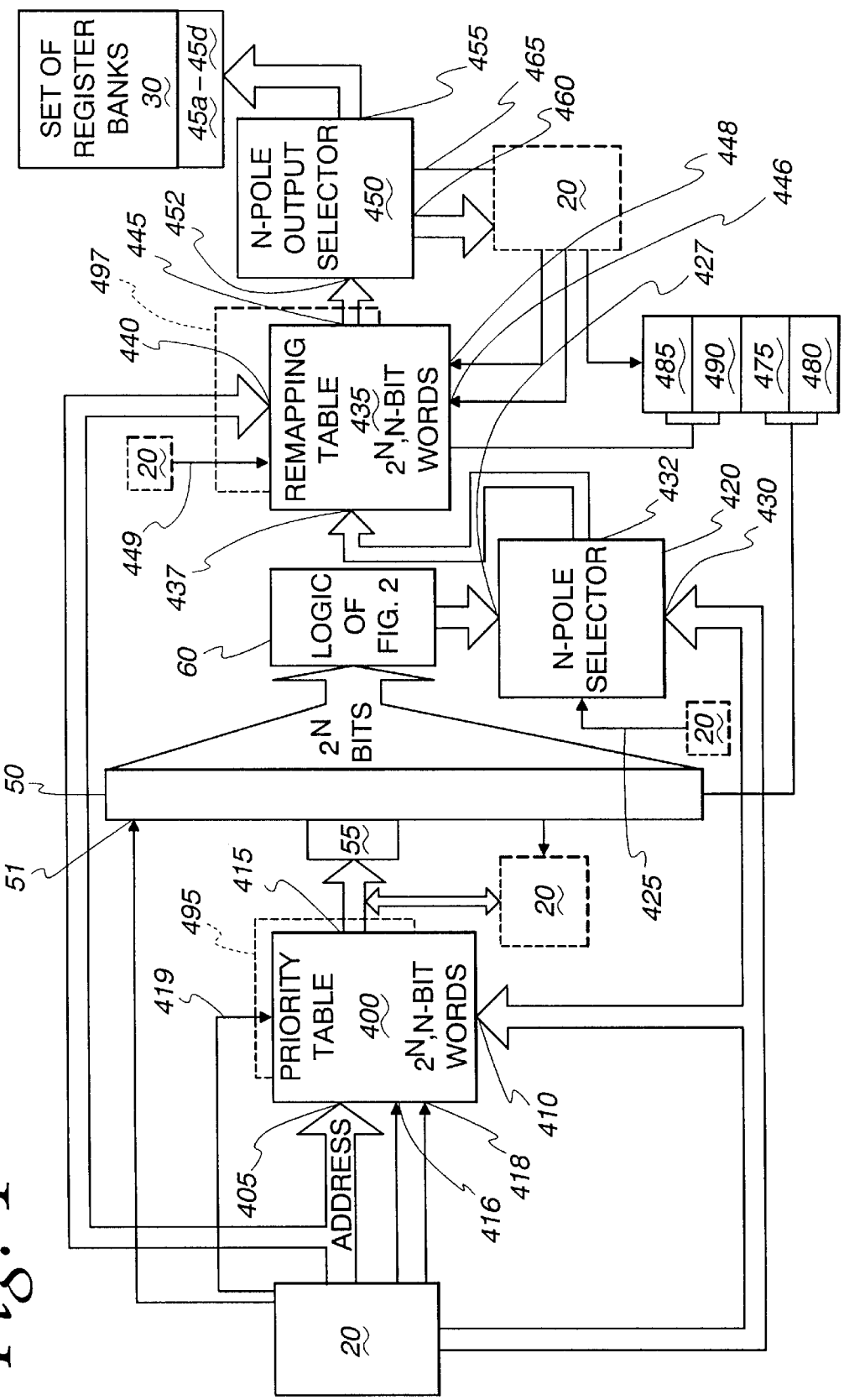
FIG. 4 is a functional block diagram illustrating the use of priority and remapping tables to alter the priority of a program.

Further, the current program may alter the status of inactive programs or programs suspended in the active state (discussed with respect to FIG. 4). In this case, the program determining logic 60 immediately determines the status bit address of the then highest priority active program, which is sent to the selection inputs 45a–45d of the set of register banks 30 to select the then highest priority active program as the current program.

Additionally, where none of the programs are in the active state, the program determination logic 60 provides a power-down indication (further discussed with respect to FIG. 2), at which time the processor 20 is placed into a power-down, or sleep mode.

Where the priorities of the programs have not been altered, the status bit addresses will correspond directly to the program addresses. However, where the priorities of one or more programs have been altered, tables are provided which maintain the relationship between the status bit addresses determined by the program determining logic circuit 60 and the program addresses, discussed with respect to FIG. 4.

Although only four register banks are shown in the set of register banks 30, due to a preference for powers of two in a binary computer, eight registers per program are assumed. Thus, additional index and/or accumulator register banks may be included in the set of register banks 30. Further, one skilled in the art would realize that any number of register banks may be included in the set of register banks 30, to provide the specific processor sufficient storage space for storing information for programs.

The set of register banks 30 may be constructed as a Random Access Memory (RAM) having a number of words equal to the number of programs, each word being of bit length equal to the total bit length of all the registers in one register set arranged end-to-end. For example, where information for 256 programs is stored in a set of eight register banks, and each register is a 32 bit register, such a memory would be an 8 kilobyte RAM which occupies very little chip area in today's technology.

The status register 50 may be constructed of a suitable addressable register having a number of storage locations equal to the number of programs. For example, where there are 256 programs, the status register 50 may be a 256 bit register indexed by an 8-bit status bit address. Using an explicit register for storing the status of each program allows simultaneous access of all bits of the status register to the program determining logic.

The status bits have been described as "1" indicating active status and "0" indicating inactive status. However, one skilled in the art would realize that "0" could be assigned active status and "1" could be assigned as inactive status. In this case, the program determining logic 60 would determine the highest priority "0" as the highest priority active program.

Thus, a system is provided allowing a processor 20 to switch from performing one program to performing another program when the second program has a higher priority than the first program and is suddenly called upon. Rapid resumption of the lower priority task after completion of the higher priority task is also provided. The set of register banks 30 constructed as a RAM allows the processor 20 to quickly execute the current program indicated at the selection inputs 45a–45d. The addressable register comprising the status bit register 50 allows the processor 20 to rapidly change a status corresponding to a program. The program determining logic 60, having simultaneous access to all locations of the status register 50, nearly instantaneously indicates the program address of the highest priority active program without the need to perform software scanning, thereby conserving a significant amount of processor instructions and battery power for each program switch.

FIG. 2 illustrates a functional block diagram of the program determining logic 60. The status register 50, which for the preferred embodiment includes 256 locations, is coupled to a first level 110 of the program determining logic 60. The first level 110 includes a 128 input OR gate 115 and a first array 120 of 128 two-way selector switches 120. Each two-way selector switch includes a first input, a second input, and an output. For example, a two-way selector switch 125 includes a first input 127, a second input 129, and an output 130. A highest priority one-half 140 of the locations of the status register 50 are coupled to the 128 input OR gate 115, and to a corresponding second input of a selector switch in the array of selector switches 120. A lower priority one-half 150 of the locations of the status register 50 are coupled to a corresponding first input of a selector switch in the first array of selector switches 120. An output 155 of the 128 input OR gate 115 is coupled to both a most significant location (MSL) 160a of a program address register 160, and to a control signal line 157, which controls each of the two-way selector in the first array 120.

The presence of a "1" on signal line 157 causes the second input of each selector switch of array 120 to be selected, where a "0" on signal line 157 causes the first input to be selected. The first level 110 is further connected to a second level 170. More specifically, the highest priority one-half 175 of the outputs of the first array 120 are coupled to a 64 input OR gate 180 and to the second input of a second array 64 of two-way selector switches 185. A lowest priority one-half 190 of the outputs of the first array 120 are coupled to the first input of the second array 185. An output 195 of the 64 input OR gate 180 is coupled to a second MSL 160*b* of the program address register 160 and to a control signal line 200 which controls the second array of two-way selector switches 185. The second level 170 is further connected to a third level 210 which includes a 32 input OR gate (not shown) and a third array of two-way selector switches (not shown), in a similar fashion as the first level 110 is connected to the second level 170. The third level 210 through a sixth level 220 are connected in a similar fashion as described above and include OR gates and two-way selectors, where the number of inputs to the OR gates and the number of two-way selectors successively decrease by powers of two. The sixth level 220 is further coupled to a seventh level 230. The seventh level includes a two input OR gate 235 and a seventh array of 2 two-input selector switches 240. The highest priority one-half 250 of the outputs from the sixth level 220 are connected to the two input OR gate 235 and to the second inputs of the seventh array of two-way selector switches 240. The lowest priority one-half 255 of the outputs of the sixth level 220 are coupled to the first inputs of the seventh array 240. An output 260 of the two input OR gate 235 is coupled to a seventh MSL 160*g* of the program address register 160, and to a control signal line 265 which controls the seventh array 240. An output 270 of a highest priority two-way selector switch 275 of the seventh array 240 is connected to a least significant location 160*h* of the program address register 160, and to the second input of a single selector switch 280. The least priority two-way selector switch 277 of the seventh array 240 is coupled to the first input of the single selector switch 280, the switch 280 for providing a power-down indication 295. The output 270 is further coupled to the control signal line 285 for controlling the single two-way selector switch 280. When all status bits stored in the status register 50 indicate inactive status (i.e., all bits in status register 50 are "0"), levels one through seven of the program determining logic 60 cause a "0" to be present at the power-down indication 295, indicating that the processor may be placed in a power-down mode, for example a sleep mode.

In operation, if a "1" indicating active status is located in the highest priority one-half 140 of the status bit address register 50, the output 155 and the MSL 160*a* become a "1", and the first array of two-way selector switches 120 is controlled through the control signal line 157 to select the second inputs. However, if a "1" is not present in the highest priority one-half 140, the output 155 and the MSL 160*a* becomes a "0", and the control signal line 157 causes the first array 120 to select the first inputs.

In the second level 170, if any of the highest priority one-half 175 of the outputs from the array 120 indicate a "1", the output 195 of the 64 input OR gate 180 and the second MSL 160*b* become a "1", and the control signal line 200 causes the second array 185 to select the second inputs. If the output 195 is a "0", the second MSL 160*b* is set to "0" and the control signal line 200 causes the second array 185 to select the first inputs, thereby selecting the lower priority one-half 190 of the outputs of the first array 120. The logic for the third level 210 through the sixth level 220 operates in a similar fashion, determining values for corresponding MSLs (not shown) in the program address register 160.

At the seventh level 230, the output 260 of the two input OR gate 235 sets the value of the seventh MSL 160*g*, and controls the seventh array 240 via the control line 265 to select the second inputs if a "1" is indicated in the highest priority one-half 250 of the sixth level 220. The first inputs of the seventh array 240 are chosen if the output 260 indicates a "0", thereby selecting the lower priority one-half 255 of the sixth level 220. The output 270 of the highest priority two-way selector 275 then supplies the value for the least significant location 160*h* of the program address register 160, and further controls the single two-way selector 280 via control signal line 285. If the value at output 270 is a "1", the second input of the two-way selector 280 is selected. If, however, the output 270 is "0", the first input of the two-way selector 280 is selected. A value of "1" at the power-down indication 295 indicates that the value stored in program address register 160 is the address of the highest priority active program, and no power-down is necessary. A value of "0" at the power-down indication 295 indicates that there are currently no active status programs to be executed by the processor 20, in which case a power-down, such as placing the computer into a sleep mode, would be useful to conserve power.

If the highest priority location of the status register 50 is identified by the 8 bit address "00000000" and the lowest priority location of the status register 50 is identified by "11111111", the value in the program address register 160 must be complemented to yield the status bit address for the highest priority active location. However, if the highest priority location of the status address 50 is identified by "11111111" and the lowest priority location is identified as status register "00000000", the value in the program address register 160 directly yields the status bit address of the highest priority active program.

In an alternative embodiment, a single input OR gate 290 is coupled to the output 270 of the seventh array 240, where an output of the OR gate 290 supplies the value for the least significant location 160*h*, and controls the single two-way selector 280 via the control signal line 285.

Figure 3A:
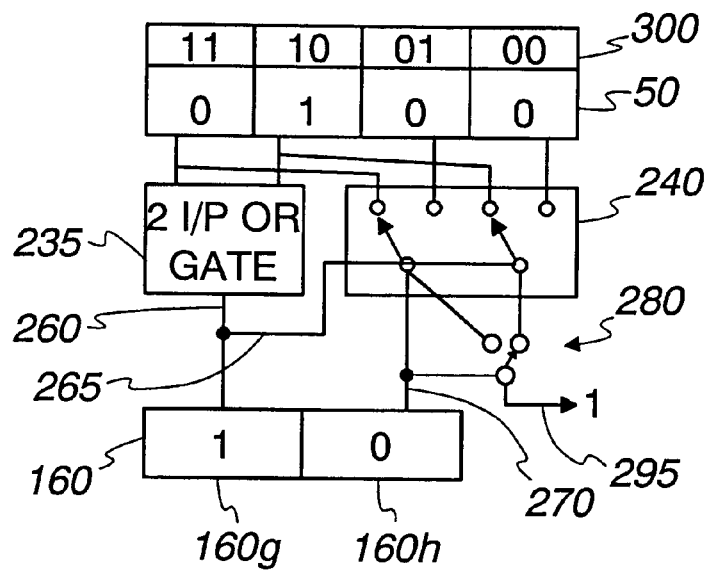
FIGS. 3a and 3b illustrate example operations for the program determining logic.

FIG. 3*a* shows an example operation of the program determining logic 60 where there are four programs, the lowest priority program designated as "00" and the highest priority program designated as "11". Components of FIG. 3*a* identified by the same reference numerals as components of FIG. 2 are the same and will not be further discussed. FIG. 3*a* further shows a row 300 representing status bit addresses for the status register 50.

In operation, the output 260 of the two input OR gate 235 becomes a "1", thereby setting the value of the location 160*g* of the program address register 160 and causing the seventh array 240 to select the second inputs as shown. The output 270 sets the value in the location 160*h* to "0" and causes the single two-way selector 280 to choose the first input, yielding a power-down indication of a "1" indicating that the address in program address register 160 represent the highest priority active program, and no power-down is necessary.

Figure 3B:
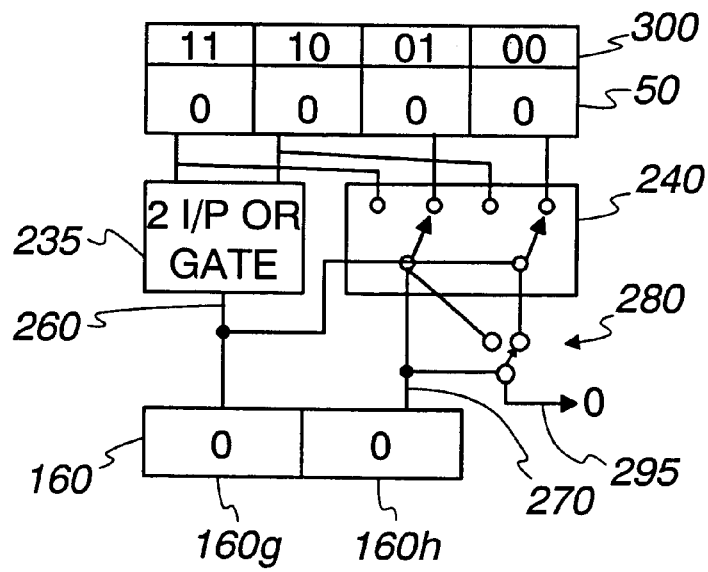

FIG. 3*b* shows a further example operation of the program determining logic 60 with four programs, where the least priority program is indicated by address "00" and the highest priority program is indicated by address "11". Components of FIG. 3*b* corresponding to components of FIG. 3*a* are identified with the same reference numerals and will not be discussed.

In operation, the output 260 of the two input OR gate 235 becomes a "0" setting the value of location 160*g* of the program address register 160 to "0" and causing the seventh array 240 to select the first inputs as shown. The output 270 becomes "0", setting location 160*h* to "0" and causing the single two-way selector 280 to select the first input. Power-down indication 295 outputs a "0" power-down indication, indicating that there are currently no programs having the active status. In this situation, a useful behavior might be to place the processor 20 in a power down state, for example, by stopping in the clock to the arithmetic-logic unit, such that no more power is consumed from the power supply. If, however, the value at status bit address "00" of status register 50 was a "1" (not shown), the power-down indication 295 outputs a "1" indicating that the highest priority active program is at status bit address "00" and no power-down is necessary.

Each two-way selector 125 (see FIG. 2) is preferably a bilateral switch formed on a suitable silicon substrate as is known in the art.

Although the program determining logic 60 is shown for the case where the number of programs is 256, one skilled in the art would realize that equivalent logic could be designed to process information from a status register supporting any number of programs.

Thus, the program determining logic 60 virtually instantaneously determines the highest priority active program as indicated by the status bits stored in the locations of the status register 50. This is accomplished as the logic gates and selector switches have simultaneous access to each location of the status register 50, eliminating the need for software scanning. This saves the significant amount of processor instructions required for software scanning, thereby conserving battery power. Further, in the case where there are no current active programs so that a sleep mode is appropriate, the program determining logic 60 reaches this decision faster than existing systems. This allows the processor 20 to be placed in a sleep mode in a more rapid fashion, thereby conserving a greater amount of battery power than existing systems.

FIG. 4 is a functional block diagram illustrating a system having a priority register (table) and a remapping register (table) for allowing priorities for programs to be altered. When priorities are altered, the status bit addresses of status register 50 no longer correspond directly to the program addresses. The priority table and remapping table map the relationship between the status bit addresses and the program addresses.

One way of altering the relative priority of different program contexts would be to alter the set of registers that a program was allocated. This would require copying the current contents of the register bank for a program from a program bank address corresponding to the current priority to a program bank address corresponding to the desired priority. If the program bank corresponding to the desired priority was already occupied by another program context, its contents would first have to be saved and then re-stored in yet another program bank address corresponding to the priority to which it wold have to be shifted to make room for the first program. This could cause further ripple effects until a stable set of allocations was reached. While such register bank shuffling was in progress, all program execution would have to be suspended to avoid malfunction. This has the undesirable consequence that a low-priority program requesting a change to a medium priority can cause delay in execution of a high priority program. To avoid this, it might be thought that a mirror image of the entire program register banks could be kept in memory, manipulated offline to shuffle priorities, then copied to the real program register bank after shuffling was complete. The problem with this method, however, is that the contents of the program register banks are dynamically changing with program execution, therefore while manipulating a mirror image offline, it would become out-of-date. Therefore, the best that can be achieved using the above-described method is to wait until the program requesting a priority change is scheduled to run (thereby avoiding stealing cycles from a higher priority program); then shuffling the register bank contents while inhibiting any context switching until complete; then re-enabling context switching so that the now-highest priority program will resume execution. With the latter method, due to the relatively long time required to shuffle the register bank contents, being a total of perhaps 8 k bytes, it will often occur that resumption of executing a high priority program is delayed due to the shuffling process. Consequently, an alternative and preferred method of raising or lowering program priorities is described below that involves manipulating only 256-byte registers offline, the contents of which are not dynamically changing with program execution, in contrast to the program register banks.

The processor 20 is connected to a priority table 400 via a priority address selector 405, where the priority table 400 is a register bank comprising $2^N$, N-bit words. For example, where there are 256 programs, the priority table 400 is a register bank having 256 8-bit words. The priority table 400 is a 1:1 table addressed sequentially from address 0 through address $2^N$, the addresses corresponding directly to the program address. The priority table maps the program address to a corresponding status bit address of the status register 50. A value stored in the priority table 400 at the location corresponding to the program address represents a current priority for the program corresponding to the program address. The priority table 400 also includes a read enable pin 418, for enabling the data stored at the address provided to the priority address selector 405 to be output through a priority output 415. The priority output 415 is connected to the status address input 55 of the status register 50. The status register 50 is coupled to the program determining logic 60, which is coupled to an N-pole selector 420.

The N-pole selector 420 is formed from an array of N two-way selector switches similar to the array 120 of FIG. 2. Each of the two-way selectors has a first input like the first input 127, a second input like the second input 129, and an output like the output 130. The array of the N two-way selector switches is controlled by a selector control 425 in the same fashion as the signal line 157 controls the array 120 in FIG. 2. The program determining logic 60 is connected to a first input 427 of the N-pole selector 420, and the processor 20 is connected to a second input 430 of the N-pole selector 420. More specifically, each location of the program address register 160 of program determining logic 60 is connected to a corresponding first input of one of the two-way selector switches of the N-pole selector 420, and each bit of an N-bit register of processor 20 is connected to a corresponding second input of the N two-way selector switches of the N-pole selector 420. Where the status of a program has been altered, the selector control 425 causes the N-pole selector 420 to select the information present at the first input 427 to be provided to the remapping table 435. However, where the priority of a program is desired to be changed, the selector control 425 causes the N-pole selector 420 to select the information present at the second input 430 to be provided at the N-selector output 432, which is provided to the remapping table 435.

The remapping table 435 is a register bank having $2^N$, N-bit words. The remapping table is a 1:1 table addressed sequentially from address 0 through address $2^N$, the addresses corresponding directly to status bit addresses (program priorities). The remapping table 435 is the inverse of the priority table, where a value X stored at an address Y in the priority table 400 corresponds to a value Y stored at an address X of the remapping table 435. Thus, the remapping table maps the status bit address to a corresponding program address. The remapping table 435 has a remapping output 445, and a read enable pin 448 for enabling the data stored at an address provided to the remapping address selector 437 to be output through the remapping output 445. Thus, where the read enable pin 418 is enabled, a priority provided at the remapping address selector 437 yields a corresponding program address from the remapping table 435 at the remapping output 445.

The remapping output 445 is connected to an N-pole output selector 450 of similar construction as the N-pole selector 420. The N-pole output selector 450 has an N-pole input 452 connected to the remapping table output 445. The N-pole output selector 450 further includes a first N-pole output 455 connected to the selection inputs 45a–45d of the set of register banks 30, and a second N-pole output 460 connected to the processor 20. The N-pole output selector 450 is controlled by an N-pole control input 465 coupled to the processor 20 for controlling which of the two outputs the N-pole input 452 will be coupled. Where the status of a program has been altered, the processor 20 will send a signal over the N-pole control input 465 causing the N-pole output selector 450 to select the first N-pole output 455. However, where the priority of a program has been altered, the processor 20 sends a signal over the N-pole control input 465 causing the N-pole output selector 450 to select the second N-pole output 460.

While a computer is in operation, various circumstances could cause a change to the status of a program executable by the computer. For instance, once the processor 20 has completed execution of a program, the status of the program must be changed from a "1" to a "0". Additionally, execution of a particular program may affect the status of another program. For example, where the computer is used to operate a cellular telephone, a program being executed to accept input from a cellular telephone keypad, such as a telephone number, may cause a program for displaying information to a cellular telephone display to become active when a user enters numerals into the cellular telephone keypad.

To change the status of a program, the processor 20 provides a signal to the read enable pin 418 allowing data to be read from the priority tables at the priority output 415. The processor 20 further provides a signal to the selector control 425 to select the first input 427, thereby providing the status bit address of a highest priority active program to the remapping table 435 after the status of a program has been altered. The processor 20 also provides a signal to the control input 465 to select the first output 455, thereby causing the program address read from the remapping table 435 to be provided to the selection inputs 45a–45d to select the current program.

The processor 20 provides the program address corresponding to the program for which a status change is desired to the priority address selector 405. The data (status bit address) stored at the location corresponding to the program address is output at the priority output 415, and provided to the status address input 55 of the status register 50. The processor 20 provides the desired status value (i.e., "1" for active, "0" for inactive) to the status value input 51, the desired status value being stored in the status register 50 at the address provided at status address input 55. At this time, the program determining logic 60 determines the status bit address of the then highest priority active program and provides the status bit address to the N-pole selector 420, which outputs the status bit address to the N-pole selector output 432. The processor 20 provides a signal to the read enable pin 448 allowing data to be read from the remapping table at the remapping output 445. The status bit address is received at the remapping address selector 437, where the program address corresponding to the status bit address is output at the remapping output 445 and provided to the selection inputs 45a–45d via the N-pole output selector 450, causing the processor 20 to execute the program corresponding to the program address as the current program.

In some circumstances, it is desirable to alter the priority of a program executable by the processor. For example, a program for maintaining the radio link between the cellular telephone and the cellular base station typically has a high priority, wherein other programs supporting features of the cellular telephone used when no cellular telephone call is taking place, such as a calculator program or a game program, typically have low priorities. When the calculator or game program is initiated by the user of the cellular telephone, allocating computer resources to maintain the radio link is less important than allocation of resources for the calculator or game program. In such circumstances, it is desirable to alter the priority of the calculator or game program to be higher than that of maintaining the radio link.

In order to alter the priorities in the priority table 400, FIG. 4 further includes a write enable pin 416 on the priority table 400 which allows data at a priority data input 410 to be written in the priority table at a program address supplied to the priority address selector 405, thereby altering the priority of the program corresponding to the supplied program address. The priority data input 410 is connected to the processor 20 and to the second input 430 of the N-pole selector 420. Likewise, a write enable pin 446 allows data present at a remapping data input 440 to be written to the remapping table 435 at the status bit address (priority) supplied at the remapping address selector 437. The remapping data input 440 is connected to the priority address selector 405 and the processor 20. Thus, the program addresses of programs whose priorities are to be changed are presented as addresses to the priority table 400, but as data to be stored to the remapping table 435, while the corresponding new priorities desired are presented as data to be stored to the priority table 400, but as addresses to the remapping table 435. A memory 470 is shown coupled to the status register 50, the processor 20, and the remapping table 435. The memory includes four locations, first and second status memory locations 475 and 480, respectively, for storing status values ("0" or "1") for programs while priorities are being altered, and first and second remapping memory locations 485 and 490, respectively, for storing program addresses while priorities are being altered.

To change a current priority for a particular program to a desired new priority, the particular program is reallocated to a status bit address corresponding to the new priority in the status register 50 and the intervening programs are each moved one status bit address closer to the current priority. For example, assume the status register 50 is configured such that the highest priority is at the status bit address "0" and the desired new priority is of lower priority than the current priority. The particular program is placed at the new priority (thereby lowering its priority) and the intervening programs are each moved down in index (decreasing their relative status bit addresses) thereby increasing their relative priorities with respect to the particular program. While each intervening program is being moved in the status register 50, it is important that the values in the priority table 400 and the remapping table 435 be altered to maintain the relationships between the program addresses and the status bit addresses. For example, where the status bit at status bit address "10"

is moved to status bit address "01" in the status register 50, the priority at the program address corresponding to status bit address "10" in priority table 400 must be replaced with "01". The program address corresponding to the status bit address "10" may be determined using the remapping table 435. The processor 20 sends a signal over the selector control line 425 to select the second input 430 to the N-pole control input 465 to select the second N-pole output 460 and to the read enable pin 448. The current priority (status bit address) "10" is provided to the remapping address selector 437 via the N-pole selector 420, and the corresponding program address is read from the remapping table 435 by processor 20. The corresponding program address is provided to the priority address selector 405 (and to remapping data input 440). The new priority value "01" is provided to priority data input 410 (and to remapping address selector 437) and the write enable pin 416 is enabled by processor 20, thereby writing the new priority at the corresponding program address read from remapping table 435. The write enable pin 446 is then enabled by the processor 20, thereby writing the corresponding program address provided at the remapping data input 440 to the remapping table 435 at the status bit address corresponding to the new priority "01". Thus, the relationship between status bit addresses and program addresses is maintained for both the priority table 400 and the remapping table 435. The memory locations 475, 480, 485 and 490 are used to temporarily store status information and program addresses to prevent information from being over-written while priorities are being altered.

In a further embodiment, an alternate priority table 495 and an alternate remapping table 497 are provided, and are coupled to the system in a similar fashion as the priority table 400 and the remapping table 435. Alternate signal lines 419 and 449, both coupled to the processor 20, are provided which activate either the priority table 400 and the remapping table 435, or the alternate priority table 495 and the alternate remapping table 497. Such alternate tables are provided as it may be hazardous or inappropriate to allow the processor 20 to execute programs while priorities are being changed. Thus, to avoid delaying the execution of processes whose relative priorities are not being changed, in order to reallocate priority to a process which has not yet been activated, one entire copy of the priority and remapping tables may be prepared "off-line". The alternate signal is asserted through the alternate signal lines 419 and 449 when the "off-line" tables are complete, thereby making the "off-line" tables active. This allows the other programs to execute as normal without the need to devote machine cycles to a highest priority (i.e., "interrupt level") task for the purpose of altering the priority and remapping tables safely. The tables may be prepared "off-line" by executing a utility routine at the old priority level of the program whose priority is to be downgraded or upgraded, or at any chosen priority level reserved for such operating system utility functions.

The alternate priority table and the alternate remapping table may be formed using a register bank of the same size and configuration as for the priority table 400 and the remapping table 435. Alternatively, the alternate priority table and the alternate remapping table may reside in the memory 12, where the contents of the alternate priority table and the alternate remapping table are copied into the priority table 400 and the remapping table 435 when the alternate signal is sent via the alternate signal lines 419 and 449.

Altering the priority of a particular program requires that all intervening programs between the current priority and the desired new priority are shifted where there are as many programs as there are locations in each of the status register 50, the priority table 400 and the remapping table 435. This shifting is necessary as when the particular program is assigned from its old priority to a desired new priority, the program which previously held the desired new priority must be shifted by one priority to make room for the particular program. The shifted program "bumps" the next intervening program in line by one priority until a final intervening program in the chain of intervening programs is shifted to the old priority for the particular program. However, where there are less programs than locations in each of the status register, the priority table and the remapping table, such that some priorities are not assigned to a program, the process of shifting intermediate programs may end when an intermediate program is shifted into a priority location not assigned to a program. In this case, because an unoccupied location is encountered, no room for the next intervening program in the chain of intervening programs need be made.

A person skilled in the art will realize that two or more programs running at different priorities cannot simultaneously be allowed to manipulate the priority tables, i.e., changing priorities cannot be a "re-entrant" operation. As with other non-re-entrant functions, such as I/O to a peripheral device, invoking a floating point co-processor, DSP, or such the like, the method to be used comprises forming a queue or "linked-list" of priority change requests to a utility routine that will process them. This ensures that one request for a priority change is processed to completion, resulting in a valid and complete alternate priority table and remapping table, prior to beginning processing the next priority change request in the queue. A re-entrant utility subroutine can be called to prepare the change request in the form of a data object to be inserted into a linked list, and to insert it into the inked list, taking the precaution to inhibit context switching (and maybe interrupts) for the precise instant that the link pointer of the last data object in the queue is changed to point to the data object being inserted, so that another program context also calling the same re-entrant utility program does not inadvertently try to insert its data object into the queue at the same location. It would first be able to do so only after context switching (or interrupts) were again enabled, when it would find the new end-of-queue to be at the new data object just linked in, and would link its data object to that.

Likewise, the processing of the change request at the head of the queue can take place using the priority and register bank of the context supplying the request, while, however, observing similar precautions to inhibit context switching (and/or interrupts) during the exact instant when RETURNing to the calling context and transferring execution to the calling context associated with the next object in the queue for processing. Such operations can also be synchronized by using semaphores to indicate whether the priority tables are in a state of pending manipulation or in a stable state following completion of a prior manipulation.

In a further embodiment, one skilled in the art would realize that each program may be further subdivided into a number of "child-programs" by the system, by saving and retrieving the complete set of registers needed for each child-program on the stack reserved for the parent program, or elsewhere in memory as appropriate. In this case, the child programs are executed at the same priority level as the parent program.

Thus, a system is provided which allows a processor to rapidly switch from execution of one program to another when the second program has a higher priority than the first and is suddenly called upon. When used in a cellular telephone, such a system frees the processor to carry out other tasks as well as conserves cellular telephone battery power. The system includes a set of register banks which provide high speed storage and accessibility of information corresponding to the plurality of programs executable by the processor of the cellular telephone. The status register 50 having specific locations, each connected to the program determining logic 60, allows the location of the highest priority active program to be determined without the cellular telephone processor needing to perform software scanning. Thus, the efficiency of the cellular telephone processor is increased freeing the processor to perform other tasks, and conserving cellular telephone battery power. Further, where there are no active programs, a power-down indication is provided, where the power-down indication is determined much faster than in existing systems, resulting in a greater amount of cellular telephone battery power being conserved.

The priority and remapping tables allow priorities of programs to be altered, thus allowing the cellular telephone processor to tailor the application of processor resources to the task at hand. For example, the task of maintaining the radio link with the cellular base station, which is assigned a high priority during a cellular call, may be lowered in priority when a calculator feature is activated. Similarly, the task of performing mathematical calculations for the calculator feature, which is assigned a low priority during a cellular call, may be assigned a high priority after the call is completed and the calculator feature is activated.

One skilled in the art would realize such advantages would be present in other processor applications aside from processors used in cellular telephones. For example, the disclosed system and method would be useful in personal computers, or any microprocessor application where increased efficiency and/or reduced battery power consumption are desirable.

Still other aspects, objects and advantages of the present invention can be obtained by a study of the specification, the drawings and the appended claims. It should be understood, however, that the present invention could be used in alternate forms where less than all of the objects and advantages of the present invention and preferred embodiment as described above would be obtained.

What is claimed is:

1. A system for switching resources of a computer among a plurality of programs, the system comprising:
   a processor for executing programs for the computer;
   a set of register banks coupled to the processor for storing information for the plurality of programs, each register bank including a plurality of program information registers, the set of register banks having a selection input for selecting a current program for the processor to execute;
   a status register coupled to the processor for storing in a prioritized order a status bit corresponding to each program, each status bit having a status bit address and indicating a status of the corresponding program as being one of active and inactive; and
   a program determination logic circuit coupled to the status register for determining the status bit address of a highest priority active program, said program determination logic circuit coupled to the set of register banks for providing the status bit address of the highest priority active program to the selection input wherein the highest priority active program is selected as the current program.

2. The system of claim 1 wherein the program determination logic circuit comprises:
   a network of multiple-input OR gates and two-way selector switches for determining the status bit address of the highest priority active program; and
   a program address register coupled to the network for collecting the status bit address of the highest priority active program, said program address register being coupled to the selection input for providing the status bit address of the highest priority active program to the selection input.

3. The system of claim 1 further comprising set/reset logic coupled to the processor and the status register for changing the status of one of the plurality of programs by altering the status bit corresponding to the one program.

4. The system of claim 1 further comprising:
   a priority table coupled to the processor and the status register comprising a plurality of priority registers corresponding to the program information registers for storing a priority for the plurality of programs; and
   a remapping table coupled to the program determination logic circuit, the set of register banks and the priority table, wherein the remapping table is the inverse of the priority table.

5. The system of claim 4 further comprising:
   an alternate priority table coupled to the processor and the status register, said alternate priority table including a plurality of alternate priority registers corresponding to the program information registers for storing the priority for the plurality of programs while the processor is executing the current program; and
   an alternate remapping table coupled to the program determination logic circuit, the set of register banks and the alternate priority table, wherein the alternate remapping table is the inverse of the alternate priority table.

6. The system of claim 5 further comprising a selector coupled to the priority table, the alternate priority table, the remapping table and the alternate remapping table for selecting which of the priority table and the alternate priority table, and the remapping table and the alternate remapping table, are used for selecting which status bit address is sent to the selection input.

7. The system of claim 1, wherein the computer is a component of a mobile cellular telephone for controlling operation of the cellular telephone.

8. A method for switching resources of a computer among a plurality of programs, the computer including a processor for executing programs, a set of register banks for storing a plurality of program information registers in correspondence with the plurality of programs and having a selection input for selecting a current program for the processor to execute, the method comprising the steps of:
   storing in a prioritized order a status bit corresponding to each of the programs in a status register, each status bit having a status bit address and indicating a status of the corresponding program as being one of active and inactive;
   communicating the status bits from the status register to a program determination logic circuit;
   determining at the program determination logic circuit the status bit address of a highest priority status bit indicating active status; and
   communicating the status bit address to the selection input of the set of register banks to select the current program.

9. The method of claim 8 wherein the step of determining the highest priority status bit comprising the steps of:
   (a) determining if one of the status bits in a higher priority ½ of the status register indicates the active status wherein if one of the status bits indicates the active status, selecting the higher priority ½ of the status bits in the status register and recording a "1" or "0" in a most significant location (MSL) in a program address register, and if none of the status bits indicate the active status, selecting a lower priority ½ of the status bits in the status register and recording the other of a "1" or "0" in the MSL of the program address register;

(b) determining if one of the status bits in a higher priority ½ of the selected set of status bits indicates the active status wherein if one of the selected status bits indicates the active status, selecting the higher priority ½ of the status bits in the selected set of status bits and recording a "1" or "0" in a next MSL in the program address register, and if none of the selected status bits indicate the active status, selecting a lower priority ½ of the status bits in the selected set of status bits and recording the other of a "1" or "0" in the next MSL in the program address register; and (c) repeating step (b) until the selected set of status bits contains two status bits, wherein the most significant bit (MSB) of the selected set of status bits is recorded as a least significant bit (LSB) in the program address register.

10. The method of claim 9 further comprising the step of complimenting values in the program address register after the LSB is recorded in the program address register.

11. The method of claim 8 further comprising the step of placing the computer into a low power operation mode when none of the status bits indicate the active status.

12. The method of claim 8 further comprising the step of changing the status of one of the plurality of programs by altering the corresponding status bit.

13. The method of claim 12 where in the step of altering the status bit comprises:

determining the status bit address for the status bit corresponding to the one program; and placing a selected value in the determined status bit address, wherein if a desired status for the one program is active, the selected value is a "1" or "0", and if the desired status for the one program is inactive, the selected value is the other of a "1" or "0".

14. The method of claim 8 further comprising the step of altering the prioritized order of the status bits.

15. The method of claim 14 wherein the computer further includes a priority table comprising a plurality of priority registers corresponding to the program information registers, wherein the step of altering the prioritized order of the status bits includes the steps of:

receiving a changed priority for one of the plurality of programs;

determining a priority register address for the priority register, the priority register address corresponding to the one program; and storing the changed priority at the priority register address.

16. The method of claim 15 wherein the computer further includes a remapping table comprising a number of remapping registers corresponding to the priority registers, further comprising the steps of:

determining a remapping table address for the remapping table, the remapping table address corresponding to the changed priority; and storing a program address for the one program at the remapping table address.

17. The method of claim 8 wherein the computer is used in a cellular telephone, and the step of communicating the status bit address to the selection input selects the current program for the processor of the cellular telephone to execute.

* * * * *